A. F. TONNEMACHER.
BRAKE SHAFT MOUNTING FOR WAGON GEAR.
APPLICATION FILED MAY 17, 1916.

1,208,050.  Patented Dec. 12, 1916.

Witnesses

A. F. Tonnemacher
Inventor,
by
Attorneys.

UNITED STATES PATENT OFFICE.

ALBERT F. TONNEMACHER, OF HUNTINGBURG, INDIANA.

BRAKE-SHAFT MOUNTING FOR WAGON-GEAR.

1,208,050.

Specification of Letters Patent. Patented Dec. 12, 1916.

Application filed May 17, 1916. Serial No. 98,112.

*To all whom it may concern:*

Be it known that I, ALBERT F. TONNE-MACHER, a citizen of the United States, residing at Huntingburg, in the county of Dubois and State of Indiana, have invented a new and useful Brake-Shaft Mounting for Wagon-Gear, of which the following is a specification.

The present invention appertains generally to wagon gears, and relates more especially to the brake mechanism thereof.

It is the object of the invention to provide novel and improved means for mounting the rocking brake shaft, or for applying said shaft to the hounds or equivalent parts of the rear truck, whereby said shaft is effectively mounted to perform its functions.

It is also the object of the invention to provide a brake shaft mounting which can be applied to various wagon gears, which is comparatively simple and inexpensive in construction, and which is thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
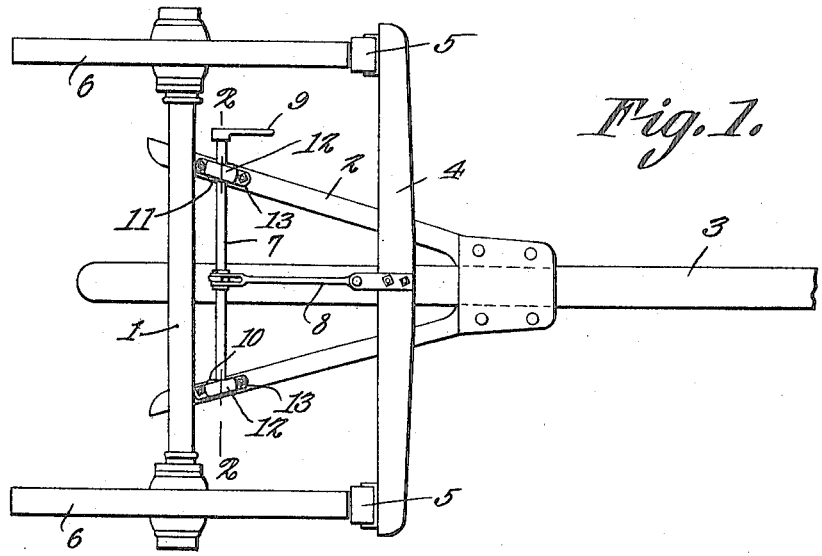
Figure 2:
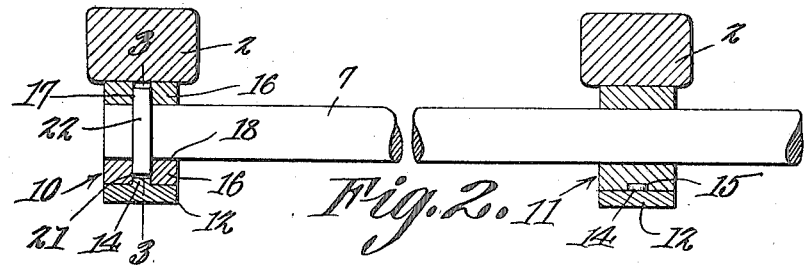
Figure 3:
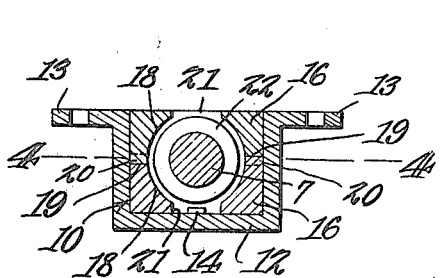
Figure 4:
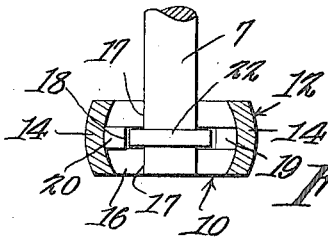
Figure 5:
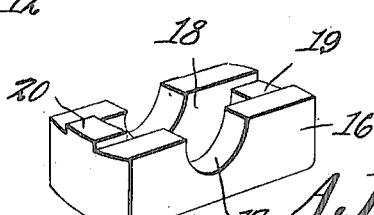

Figure 1 is a bottom plan view of the rear truck of a wagon gear. Fig. 2 is an enlarged section on the line 2—2 of Fig. 1, portions being broken away. Fig. 3 is a section on the line 3—3 of Fig. 2. Fig. 4 is a section on the line 4—4 of Fig. 3. Fig. 5 is a perspective view of one of the sections of the sectional bearing.

In the drawing, there is illustrated the rear truck of a wagon, including the axle 1 having the hounds 2 attached thereto, which hounds are in turn attached to the reach 3. A brake beam 4 has brake shoes 5 coöperable with the rear wheels 6. The brake beam 4 is operated by a transverse rocking shaft 7 connected, as at 8, with the beam 4 and provided at one end with an arm or lever 9 to which the hand lever or other operating member (not shown) is connected.

The present improvements reside in the manner of applying the shaft 7 to the hounds 2, there being employed two bearings 10 and 11. The bearing 11 can be solid or of one part, said bearing being nearest the arm 9. The shaft 7 is journaled within said bearings, and said bearings are mounted within U-shaped hangers 12 having their ends extending angularly and bolted, as at 13, to the under surfaces of the hounds 2, although said hangers or brackets can be secured upon the upper surfaces of the hounds if desired. The bearings fit snugly within the brackets 12, and the limbs of said brackets are curved or of arcuate formation, to accommodate the curved ends of the bearings, whereby said bearings can be swung about vertical axes to aline with one another and to properly accommodate and aline with the shaft 7. The intermediate portions of the brackets 12 have studs or lugs 14 to center the bearings and to provide a pivot therefor, the bearing 11 having a lower recess 15 receiving the respective lug 14.

The bearing 10 is composed of superposed sections 16 provided with complementing recesses 17 for receiving the shaft 7, and said sections 16 are provided between their side faces with semi-circular pockets 18 of larger diameter than the opening provided by the recesses 17. Each section 16 is provided at one end of the pocket 18 with a notch 19 and at the other end of the pocket 18 with a lug 20, the two sections 16 being duplicates of one another, and when the sections are placed together, the lug 20 of each section fits the notch 19 of the other section, whereby the sections interfit snugly to maintain them in relative position. The remote surfaces of the sections 16 have slots 21 extending from the pockets 18, and the lower slot 21 is adapted to receive the lug 14. The sections 16 can be inverted if desired, and have their ends curved to fit the curved limbs of the respective bracket 12. The shaft 7 is provided with a collar 22 fitting within the pockets 18, to permit the shaft 7 to rotate, but to prevent the longitudinal movement thereof. The sections 16 are applied to the shaft 7 before the respective bracket 12 is attached to the hound 2, and when said bracket is fastened to the hound, the shaft 7 is locked to the bearing 10. The brackets 12 can be disposed longitudinally of the hounds 2 or obliquely relative to the shaft 7, and said brackets can be disposed at different angles upon different wagon gears.

Having thus described the invention, what is claimed as new is:

1. A shaft mounting embodying a U-shaped bracket having attaching means at its ends, and a bearing fitting snugly within said bracket, the ends of the bearing being rounded and the limbs of said bracket being curved to accommodate the ends of the bearing, whereby the bearing can be adjusted about a vertical axis.

2. A shaft mounting embodying a U-shaped bracket having attaching means at its ends, and a bearing fitting snugly within said bracket, the ends of the bearing being rounded and the limbs of said bracket being curved to accommodate the ends of the bearing, whereby the bearing can be adjusted about a vertical axis, the intermediate portion of said bracket having pivot means with which said bearing is engaged.

In testimony that I claim the foregoing as my own, I have hereto affixed my signature in the presence of two witnesses.

ALBERT F. TONNEMACHER.

Witnesses:
J. W. FINKE,
WM. RAUSCHER.

Copies of this patent may be obtained for five cents each, by addressing the "Commissioner of Patents, Washington, D. C."